United States Patent [19]

Goto et al.

[11] 4,174,557
[45] Nov. 20, 1979

[54] METHOD OF MOUNTING VALVE SEATS IN A BUTTERFLY VALVE

[75] Inventors: Yukio Goto, Osaka; Osamu Nakai; Ikuo Yoshimori, both of Hirakata, all of Japan

[73] Assignee: Kubota, Ltd., Osaka, Japan

[21] Appl. No.: 892,341

[22] Filed: Mar. 31, 1978

[30] Foreign Application Priority Data

Apr. 5, 1977 [JP] Japan ............................. 52-43387[U]
Apr. 5, 1977 [JP] Japan ............................. 52-43388[U]

[51] Int. Cl.² ...................... B23P 15/00; F16K 1/226
[52] U.S. Cl. ............................. 29/157.1 R; 29/526 R;
251/170; 251/307; 251/314; 251/362
[58] Field of Search .......... 29/157.1 R, 401 F, 401 B,
29/526; 251/307, 314, 170, 192, 359–362;
277/189.5; 85/42, 45

[56] References Cited

U.S. PATENT DOCUMENTS

| | | | |
|---|---|---|---|
| 1,251,676 | 1/1918 | McCaffray | 85/1 K |
| 2,416,385 | 2/1947 | Gross | 251/307 |
| 2,922,455 | 1/1960 | Braendel | 85/1 R |
| 3,314,642 | 4/1967 | Kautz et al. | 251/307 |
| 3,814,380 | 6/1974 | Kormos et al. | 251/307 |

*Primary Examiner*—Francis S. Husar
*Assistant Examiner*—Daniel C. Crane
*Attorney, Agent, or Firm*—Edwin E. Greigg

[57] ABSTRACT

A method of mounting valve seats in a butterfly valve comprising a valve body mounted in a valve stem in a valve housing. The valve seats are attached to the valve housing so as to contact the periphery of the valve body when the valve is closed. End surfaces of the valve seats are adjusted relative to the valve stem and seal members by means of first bolts. Then, the first bolts are replaced with third bolts for pressing the valve seats against the periphery of the valve body.

4 Claims, 8 Drawing Figures

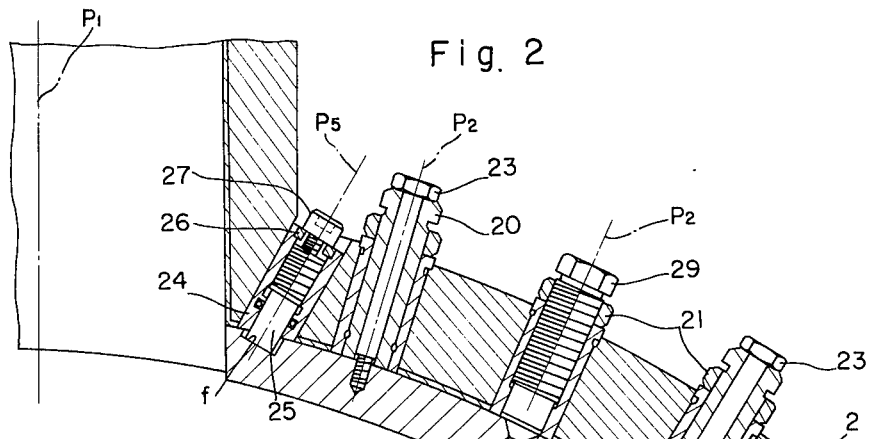
Fig. 2
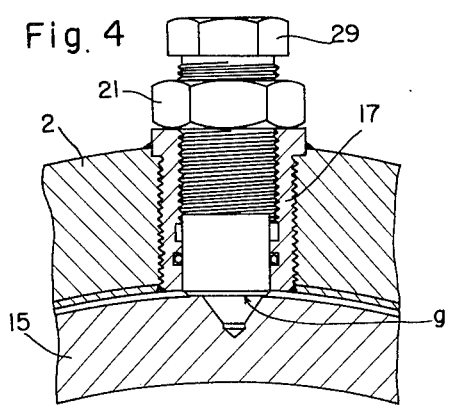
Fig. 3
Fig. 4
Fig. 5

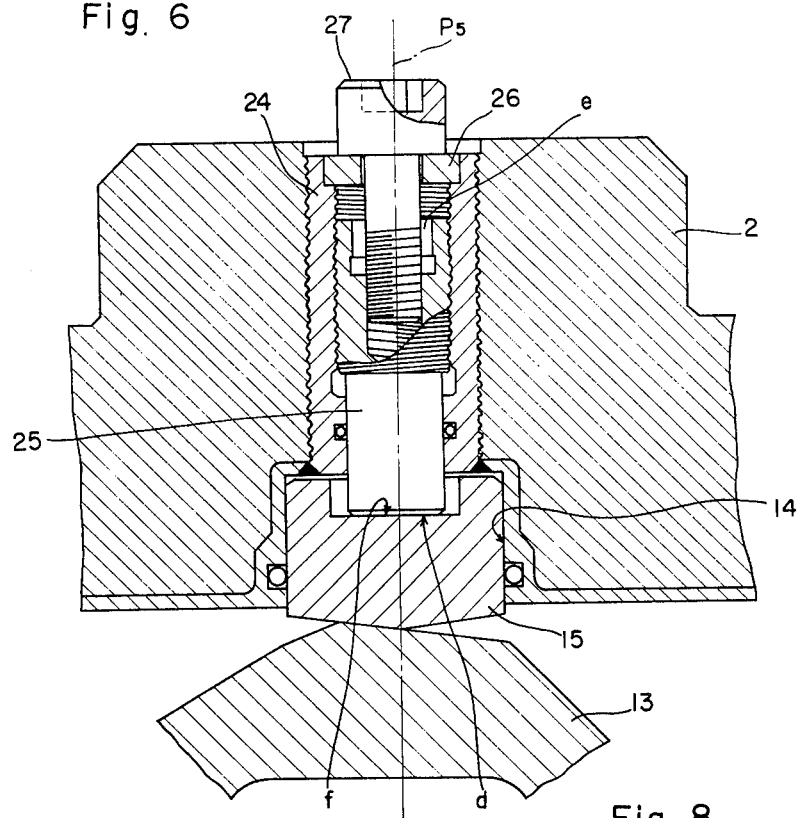
Fig. 6
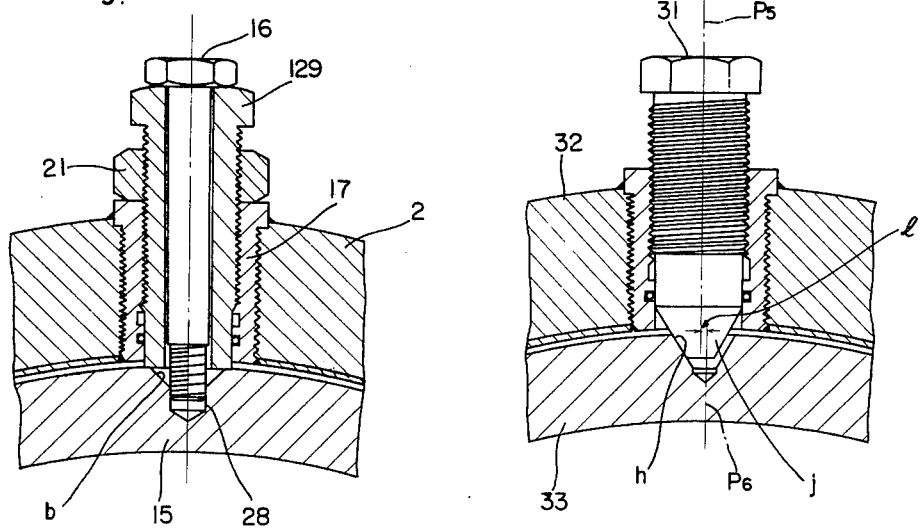
Fig. 7
Fig. 8

METHOD OF MOUNTING VALVE SEATS IN A BUTTERFLY VALVE

BACKGROUND OF THE INVENTION

1. Field of the Invention

This invention relates to a method of mounting valve seats in a butterfly valve including adjusting arcuate seat parts adapted to contact a valve body peripherally when the valve is closed, in respect of positions of end surfaces thereof, by screwing first bolts into a valve housing, each of the first bolts having a tapered tip end approximately in a cone shape to fit into a tapered hole defined on the seat parts, and adjusting the seat parts towards or away from the valve body by screwing a multiplicity of second bolts arranged peripherally of the valve body relative to the valve housing.

2. Description of the Prior Art

For maintenance of a good leakproof condition in a butterfly valve, it is essential that the valve seats are made adjustable to have the end surfaces thereof suitably disposed relative to the valve stem or seal members surrounding the valve stem, and the inner surfaces thereof movable towards and away from the periphery of the valve body.

Part of the prior art arrangement is illustrated in FIG. 8. As seen, a valve seat 33 is formed with a tapered hole h, and a valve housing carries first bolts 31 each having a tapered tip end j to fit into the hole h. Each first bolt 31 has an axis P5 slightly displaced from an axis P6 of tapered hole h by a small amount l towards an end of the valve seat 33. The first bolt 31 is screwed into the housing 32 to cause a camming action between the tapered hole h and the tapered tip end j so as to adjust the position of the end surface of the valve seat using peripherally acting components of force thus created. In addition to such provision, a multiplicity of second bolts are provided in the peripheral direction of the valve body. By screwing these second bolts relative to valve housing 32, valve seat 33 is adapted to move towards or away from the valve body.

Pressing forces to act on valve seat 33 in the vicinity of the first bolts 31 comprise only the components of force created in the screwing direction of the first bolts 31 when the positions of the ends of the valve seat are adjusted. Such pressing forces depend largely on an amount of the seat end adjustment. Even if the first bolts 31 are tightened with a torque equal to the torque for tightening the second bolts, the pressing forces of the first bolts 31 are bound to be smaller. This results in inequality in the pressures in the peripheral direction of the valve seat against the periphery of the valve body, and in liability to fluid leakage. Such is the disadvantage of the known arrangement.

SUMMARY OF THE INVENTION

In view of the above noted state of the art, this invention intends to provide uniformity of pressures in the peripheral direction of the valve seats against the periphery of the valve body, by a very simple, improved method.

In a method of mounting valve seats in a butterfly valve as described at the outset hereof, this invention is characterized by removing the first bolts after the seat parts have been adjusted in respect of positions of the end surfaces thereof, and mounting third bolts in place of the first bolts, each of the third bolts having a planar pressing end to stop the seat parts leaving the valve body.

To be more particular, the first bolts are used only to adjust positions of the end surfaces of the valve seats relative to the valve stem or the seal members, and after the adjustment the first bolts are replaced with the third bolts which are used, like the second bolts, to press the valve seats against the periphery of the valve body. By tightening the second and third bolts with an equal torque, the surface pressures in the peripheral direction of the valve seats against the periphery of the valve body are made uniform. Thus, tight contacts are suitably maintained in the inner peripheral surfaces as well as the end surfaces of the valve seats to assure a high degree of leakproof condition.

Another object of the invention is to maintain an excellent contacting condition between the end surfaces of the valve seats and the valve stem or the seal members.

Other objects and advantages of the invention will come clear from the following description.

BRIEF DESCRIPTION OF THE DRAWINGS

FIG. 2 is a sectional view showing a principal part of the butterfly valve.

FIG. 3 is a sectional view showing a mounting structure for a first bolt.

FIG. 4 is a sectional view showing a mounting structure for a third bolt.

FIG. 5 is a sectional view showing a mounting structure for a second bolt.

FIG. 6 is a sectional view showing a mounting structure for a fourth bolt.

FIG. 7 is a sectional view showing a modified mounting structure for the third bolt.

FIG. 8 is a sectional view showing one example of the known structure.

DESCRIPTION OF THE PREFERRED EMBODIMENTS

Figure 1:
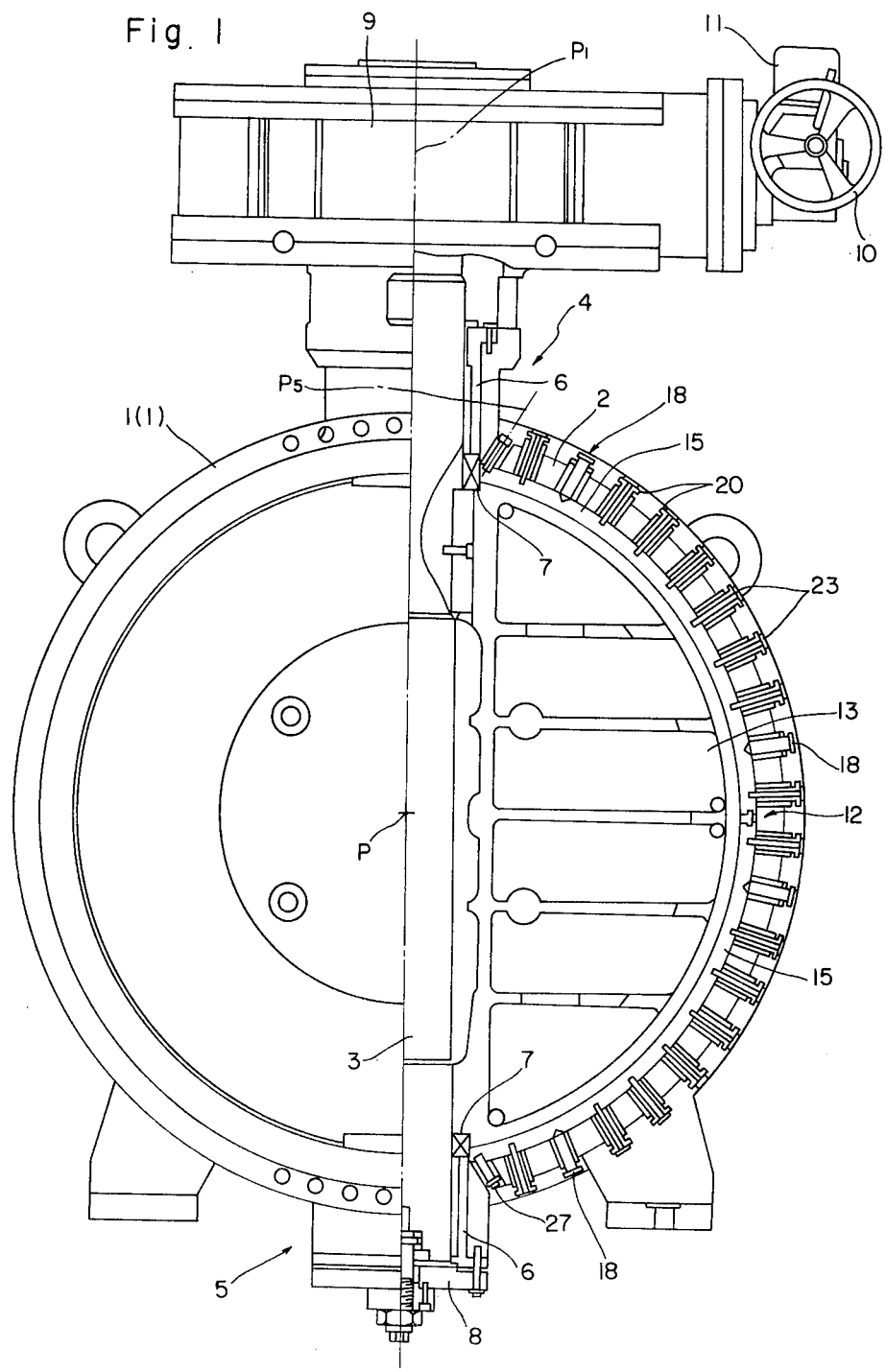
FIG. 1 is a partly sectional view showing a whole butterfly valve.

A valve housing 2 made of cast-iron or other metal has flanges 1 for coupling to pipes, and integral bearing portions 4, 5 for mounting a valve stem 3 having an axis P1 that crosses at right angles with a central axis P of the valve housing 2. Valve stem 3 is rotatably supported by bearing portions 4, 5 through bearing members 6 and seal members 7, and has one end protruding from bearing portion 4 and the other end contained in bearing portion 5 closed with a cap 8.

A reduction means comprising a worm and a worm gear is contained in a casing 9. The worm is connected to a handwheel 10 and an electric motor 11, and the worm gear is splined with the protruding end of valve stem 3, whereby valve stem 3 is rotatable by manually operating handwheel 10 or by means of electric motor 11.

Valve stem 3 carries a disc shaped metal valve body 13 securely attached thereto. To completely close the fluid passage, valve body 13 assumes a position perpendicular or about perpendicular to the central axis P of valve housing 2. To completely open the fluid passage, valve body 13 assumes a position parallel or about parallel to the central axis P.

Valve housing 2 has an annular groove in 14 (FIG. 6) defined on the inner surface to receive arcuate valve seat parts 15 made of metal which contact the periphery of valve body 13 in the closed position. Arcuate seat parts 15 are connected to form an approximately semicircular shape by a connector means 12 having a labyrinth effect, the length of the connected portions being alterable. One end surface of each seat part 15 is disposed in opposed relation with one end surface of another seat part 15 across seal member 7 fitted about valve stem 3.

Valve seats 15 are attached to annular groove 14 of valve housing 2 by means of first bolts 18 which are adapted to adjust positions of the end surfaces of valve seats 15 relative to seal members 7 and relative positions of the end surfaces at connected portions of valve seats 15. In addition second bolts 20, 23 are adapted to move valve seats 15 toward and away from valve body 13, and fourth bolts 25 are adapted to press both end surfaces of valve seats 15 against seal members 7.

Each of the first bolts 18 has a tapered tip end a approximately in a cone shape. The first bolt 18 meshes with a holder member 17 which has been screwed and welded in a threaded opening defined in valve housing 2. This opening has an axis P2 extending in the direction of central axis P of housing 2. A tapered hole b shaped to correspond with the tapered tip end a of the first bolt 18 is defined on the outer periphery of each valve seat 15 at a position adjacent to each end thereof. Holes b each have an axis P3 from which axis P2 of each of the first bolts 18 is displaced by a small amount $l_1$, one towards the valve stem and the other towards the seat connecting portion. By screwing the first bolts 18 into valve housing 2 to cause a camming action between the tip ends a of first bolts 18 and holes b, the position of each valve seat 15 is adjusted towards the connecting portion and towards the end surface.

Each of bolts 20 has a planar end surface c to press valve seat 15 against the periphery of valve body 13. Bolt 20 meshes with a holder member 19 which has been screwed and welded in each of threaded openings defined in the valve housing 2 with a space between one another in the peripheral direction of the valve body in the closed position. Each of the openings has an axis P4 extending in the direction of the central axis P of the housing. Each of the bolts 20 has a locking nut 21 fitted thereon. Valve seat 15 has threaded holes 22 each of which is adapted to meshingly receive a bolt 23 extending loosely through a centre bore of bolt 20 to draw valve seat 15 towards valve housing 2 using bolt 20 as the reaction point. Thus valve seats 15 are arranged to move towards and away from valve body 13 by means of bolts 20 and bolts 23.

Each of the fourth bolts 25 has a planar pressing end d and a hole e for engagement with a socket wrench and the like. The fourth bolt 25 meshes with a holder member 24 in a manner to be completely embedded therein, which holder member 24 has been screwed and welded in a threaded opening defined in the valve housing 2. This opening has an axis P5 inclined by about 30 degrees relative to axis P1 of the valve stem. A bolt 27 is provided to penetrate an element 26 in engagement with holder member 24 and to mesh with a threaded hole defined in bolt 25 deeper down from hole e. Valve seat 15 has a recess f with the bottom surface perpendicular to axis P5. Thus, the ends of valve seats 15 are arranged to gain tight contact with seal members 6, movement thereof away from valve stem 3 being prevented, by screwing the fourth bolts 25 relative to valve housing 2 to press the end surfaces of valve seats 15 towards valve stem 3.

Each of the bolts 27 are tightened after the valve seats have been pressed and adjusted by means of fourth bolts 25, whereby each of the fourth bolts 25 are prevented from turning by a pulling action of bolt 27 with element 26 engaged with holder member 24 serving as the reaction point. The space required outside the housing for stopping the turning of fourth bolts 25 is only such as required for operating locking bolts 27, and this permits second bolts 20, 23 to be disposed near the fourth bolts 25. Therefore, portions of the valve seats adjacent to the ends are capable of maintaining a high pressure against the periphery of the valve body.

After the positions of the end surfaces of valve seats 15 have been adjusted by means of first bolts 18, the valve seats 15 are fixed to valve housing 2 by means of a multiplicity of second bolts 20, 23. Then, third bolts each having a planar pressing end g to stop valve seat 15 leaving the valve body 13 are screwed into holder members 17 in the place of first bolts 18. By tightening second bolts 20, 23 and third bolts 29 with the same torque, pressures of the valve seats against the periphery of the valve body are made uniform.

Each of the third bolts 29 may have the same shape as the valve seat pressing bolt 20 of the second bolts 20, 23. As shown in FIG. 7, each of the tapered holes b may be provided with a threaded hole 28 extending to a further depth and third bolts 129 each having a bolt 16 to mesh with the threaded hole 28 may be mounted in the place of first bolts 18 after the positions of the end surfaces of the valve seats have been adjusted. This arrangement enables valve seats 15 to be adjusted towards and away from valve body 13 by means of third bolts 129.

We claim:

1. A method of mounting a valve seat including a plurality of arcuate seat parts having end surfaces, in a butterfly valve having a disc-shaped valve closure member and stem portions which offstand therefrom and arranged to support seal means disposed in a valve body and arranged to contact said seat parts peripherally when the valve closure member is closed, said method comprising adjusting said seat parts relative to the positions of said end surfaces thereof by screwing a series of first bolts into said valve body, each of said first series of bolts having a tapered extremity substantially of conical shape and formed complemental to recesses in said seat parts, and a second series of bolts screwed into said valve body arranged to adjust said seat parts relative to the positions of said end surfaces, said method further including the steps of
    (a) adjusting the first and second series of bolts to properly position said seat parts relative to said valve body,
    (b) removing said first series of bolts from said valve body, and
    (c) inserting a third series of bolts having a planar end into said valve body in place of said first to equalize pressure on said seat parts against said valve member.

2. A method of mounting a valve seat as claimed in claim 1, and particularly as recited in (c) wherein said third series of bolts comprise sleeve-like members which cover said recesses in said seat parts.

3. A method of mounting a valve seat as claimed in claim 1, the further steps of
    (d) mounting further bolt means in said valve body in close proximity to the end surfaces of said arcuate seat parts, and
    (e) applying pressure to said further bolt means to constrict said end surfaces toward said stem portions of said valve closure member.

4. A method of mounting a valve seat as claimed in claim 3, further wherein said further bolt means includes a locking means to prevent inadvertent movement thereof relative to said valve body.

* * * * *